United States Patent
Bastide et al.

(10) Patent No.: US 10,540,596 B2
(45) Date of Patent: Jan. 21, 2020

(54) CONVERSATION BRANCHING FOR MORE EFFICIENT RESOLUTION

(71) Applicant: INTERNATIONAL BUSINESS MACHINES CORPORATION, Armonk, NY (US)

(72) Inventors: Paul R. Bastide, Boxford, MA (US); Kulvir S. Bhogal, Fort Worth, TX (US); Jeffrey R. Hoy, Southern Pines, NC (US); Asima Silva, Holden, MA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/180,763

(22) Filed: Nov. 5, 2018

(65) Prior Publication Data

US 2019/0073604 A1    Mar. 7, 2019

Related U.S. Application Data

(63) Continuation of application No. 15/431,299, filed on Feb. 13, 2017, now Pat. No. 10,163,059, which is a
(Continued)

(51) Int. Cl.
*G06N 5/04* (2006.01)
*H04L 12/58* (2006.01)
*G06F 16/245* (2019.01)
*G06F 16/33* (2019.01)
*G06F 16/901* (2019.01)
*G06F 16/9535* (2019.01)
(Continued)

(52) U.S. Cl.
CPC ............ *G06N 5/048* (2013.01); *G06F 3/0482* (2013.01); *G06F 16/245* (2019.01); *G06F 16/3344* (2019.01); *G06F 16/9017* (2019.01); *G06F 16/9535* (2019.01); *G06F 17/2705* (2013.01); *H04L 51/02* (2013.01); *H04L 51/16* (2013.01)

(58) Field of Classification Search
CPC ...................................................... G06N 5/048
USPC ............................................................ 715/752
See application file for complete search history.

(56) References Cited

U.S. PATENT DOCUMENTS 6,804,668 B1    10/2004    Shambaugh et al.
9,380,010 B2    6/2016    Bastide et al.
(Continued)

OTHER PUBLICATIONS

U.S. Appl. No. 15/431,299, filed Feb. 13, 2017, now Pending.
(Continued)

*Primary Examiner* — William D Titcomb
(74) *Attorney, Agent, or Firm* — L. Jeffrey Kelly

(57) ABSTRACT

A method for conversation branching may include storing a plurality of messages communicated in an online conversation and generating a fingerprint for each message. The fingerprint for each message may be stored in a lookup table. The method may also include detecting a new message from one of the users and processing the new message to generate an artifact that correlates to the new message. The lookup table may be queried using the artifact to determine a similarity between the new message and each of the stored messages. One or more proposed reply messages to the new message may be generated for branching the online conversation to a new conversation point that corresponds to a selected one of the one or more proposed reply messages. The one or more proposed reply messages are based on one of the stored messages that has a closest similarity to the new message.

20 Claims, 4 Drawing Sheets

Related U.S. Application Data continuation of application No. 14/661,800, filed on Mar. 18, 2015, now Pat. No. 9,646,255, which is a continuation of application No. 14/295,024, filed on Jun. 3, 2014, now Pat. No. 9,380,010.

(51) Int. Cl.
*G06F 3/0482* (2013.01)
*G06F 17/27* (2006.01)

(56) References Cited

U.S. PATENT DOCUMENTS

| | | | |
|---|---|---|---|
| 9,646,255 | B2 | 5/2017 | Bastide et al. |
| 2006/0143275 | A1 | 6/2006 | Stephens et al. |
| 2008/0010287 | A1 | 1/2008 | Hinton et al. |
| 2009/0106370 | A1 | 4/2009 | Dreyfus et al. |
| 2011/0010173 | A1 | 1/2011 | Scott et al. |
| 2012/0005667 | A1 | 1/2012 | DeLuca et al. |
| 2012/0245925 | A1 | 9/2012 | Guha et al. |
| 2012/0317038 | A1 | 12/2012 | Erbey et al. |
| 2013/0006973 | A1 | 1/2013 | Caldwell et al. |
| 2013/0325941 | A1 | 12/2013 | Mann et al. |
| 2014/0056214 | A1 | 2/2014 | Jorgensen et al. |
| 2014/0215392 | A1 | 7/2014 | DeLuca et al. |
| 2016/0253593 | A9 | 9/2016 | Bastide et al. |

OTHER PUBLICATIONS

Palakorn Achananuparp et al., "The Evaluation of Sentence Similarity Measures," College of Information Science and Technology, Drexel University, Lecture Notes in Computer Science vol. 5182. 2003, pp. 305-316.

Tefan Trau An-Matu et. al., "Analysis of Discourse in Collaborative Learning Chat Conversations with Multiple Participants. Tufis, D. Corina Forascu" eds.). Multilinguality and Interoperability in Language Processing with Emphasis on Romanian, Editura Academe, 2010 p. 313-330, Bucharest.

Mostafa Dehghani et. al., "A Learning Approach for Email Conversation Thread Reconstruction", Journal of Information Science, Dec. 2013, p. 846-863, vol. 39 No. 6, Sage Publications, Iran.

International Business Machines; "SPSS Statistics," downloaded from <http://www-01.ibm.com/software/analytics/spss/products/statistics/> on Jun. 3, 2014, pp. 1-2.

Wikipedia, "Natural Language Processing," downloaded from <http://en.wikipedia.org/wiki/Natural_language_processing> on Apr. 21, 2014, pp. 1-10.

International Business Machines; "SPSS Text Analytics for Surveys," downloaded from <http://www.03.ibm.com/software/products/en/spss-text-analytics-surveys> on Apr. 21, 2014, pp. 1-2.

CONVERSATION BRANCHING FOR MORE EFFICIENT RESOLUTION

CROSS-REFERENCE TO RELATED APPLICATIONS

This application is a continuation application of U.S. patent application Ser. No. 15/431,299, filed Feb. 13, 2017, which is a continuation application of U.S. patent application Ser. No. 14/661,800, filed Mar. 18, 2015, now U.S. Pat. No. 9,646,255, which is a continuation of U.S. patent application Ser. No. 14/295,024, filed Jun. 3, 2014, now U.S. Pat. No. 9,380,010, the contents of which are incorporated herein by reference in its entirety.

BACKGROUND

Aspects of the present invention relate to online mail clients, social networks and the like, and more particularly to a method, system and computer program product for branching online conversations to a better conversation point for more efficient resolution.

Mail clients and online social networks are the mechanisms that allow users to engage in online conversation. Common examples of these mechanisms may include but is not necessarily limited to inboxes, walls, activity streams, timelines and profiles. In conversations, there may be latent indicators that may enable one to establish or determine expertise, develop a common understanding or trigger a "short-circuit" of the conversation or reduce the time needed for interaction between the users. For example, in verbal speech, a user calling tech support with the issue "my internet button doesn't work" may be treated differently from another more sophisticated user that is able to characterize the issue as "trace routes are failing between your branch and the upstream provider". This additional or more detailed characterization of the issue may help tech support focus the conversation more quickly on the root cause of the problem and reduce the interaction with the user for a much more efficient resolution. An indication in a conversation of where to direct a conversation is typically missing in online conversations with persons of unfamiliar or foreign backgrounds.

BRIEF SUMMARY

According to one aspect of the present invention, a method for conversation branching may include storing, by a processor, a plurality of messages communicated in an online conversation between at least two users and generating, by the processor, a fingerprint for each message of the online conversation. The method may also include storing, by the processor, the fingerprint for each message of the online conversation in a lookup table. The method may additionally include detecting, by the processor, a new message from one of the users and processing, by the processor, the new message to generate an artifact that correlates to the new message. The method may also include querying, by the processor, the lookup table using the artifact to determine a similarity between the new message and each of the stored messages. The method may further include generating, by the processor, one or more proposed reply messages to the new message for branching the online conversation to a new conversation point that corresponds to a selected one of the one or more proposed reply messages. The one or more proposed reply messages may be based on one of the stored messages that has a closest similarity to the new message.

According to another aspect of the present invention, a system for conversation branching may include a processor and a conversation branching module operating on the processor. The conversation branching module may be configured to perform a set of functions that may include storing a plurality of messages communicated in an online conversation between at least two users and generating a fingerprint for each message of the online conversation. The method may also include storing the fingerprint for each message of the online conversation in a lookup table. The method may also include detecting a new message from one of the users and processing the new message to generate an artifact that correlates to the new message. The method may additionally include querying the lookup table using the artifact to determine a similarity between the new message and each of the stored messages. The method may further include generating one or more proposed reply messages to the new message for branching the online conversation to a new conversation point that corresponds to a selected one of the one or more proposed reply messages. The one or more proposed reply messages may be based on one of the stored messages that has a closest similarity to the new message.

According to another aspect of the present invention, a computer program product for conversation branching. The computer program product may include a computer readable storage medium having program instructions embodied therewith. The program instructions may be executable by a device to cause the device to perform a method that may include storing a plurality of messages communicated in an online conversation between at least two users and generating a fingerprint for each message of the online conversation. The method may also include storing the fingerprint for each message of the online conversation in a lookup table. The method may also include detecting a new message from one of the users and processing the new message to generate an artifact that correlates to the new message. The method may additionally include querying the lookup table using the artifact to determine a similarity between the new message and each of the stored messages. The method may further include generating one or more proposed reply messages to the new message for branching the online conversation to a new conversation point that corresponds to a selected one of the one or more proposed reply messages. The one or more proposed reply messages may be based on one of the stored messages that has a closest similarity to the new message.

BRIEF DESCRIPTION OF THE SEVERAL VIEWS OF THE DRAWINGS

The present invention is further described in the detailed description which follows in reference to the noted plurality of drawings by way of non-limiting examples of embodiments of the present invention in which like reference numerals represent similar parts throughout the several views of the drawings and wherein.

DETAILED DESCRIPTION

Figure 1A:
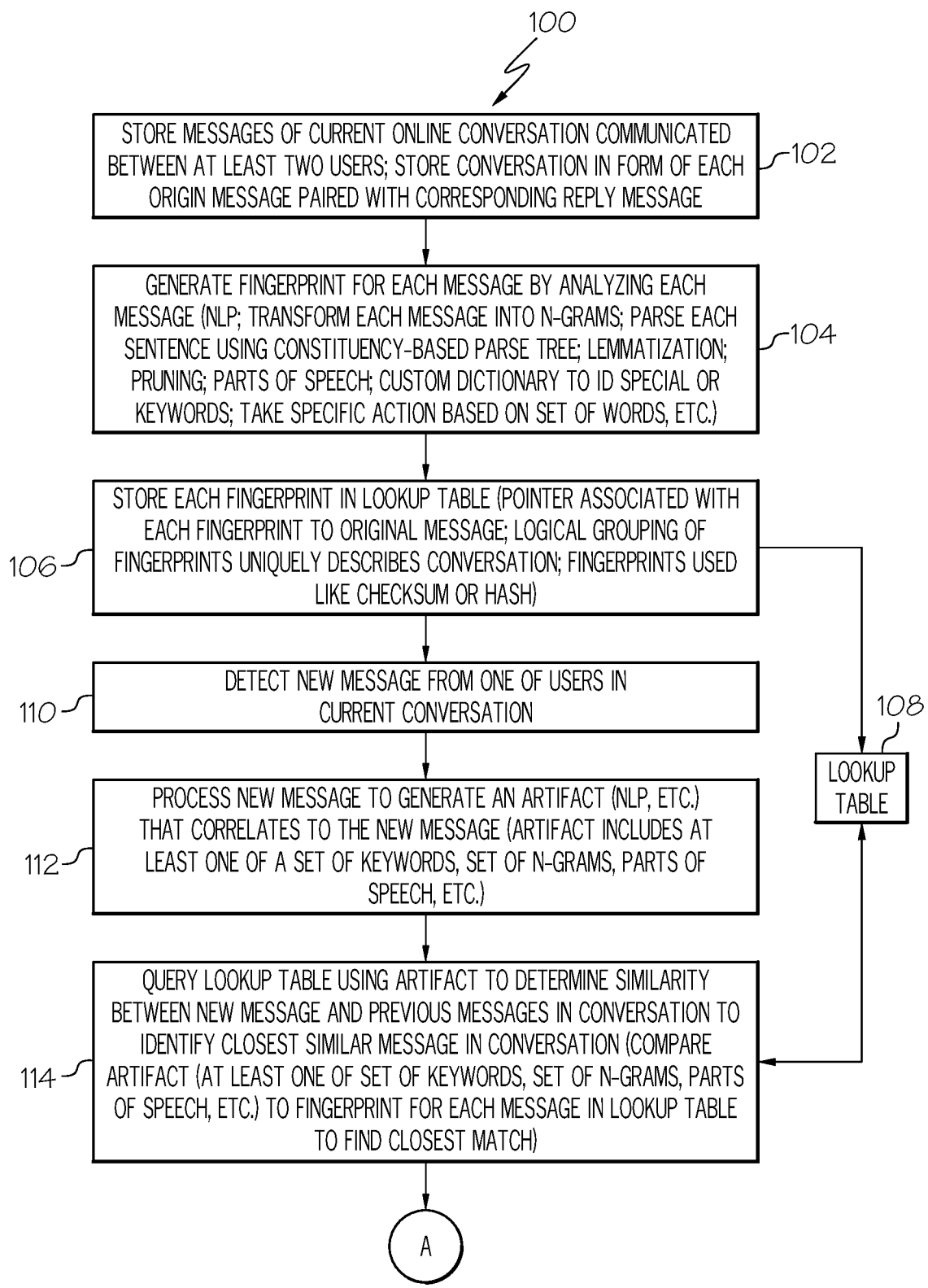
FIGS. 1A and 1B (collectively FIG. 1) are a flow chart of an example of a method for online conversation branching in accordance with an embodiment of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Figure 1B:
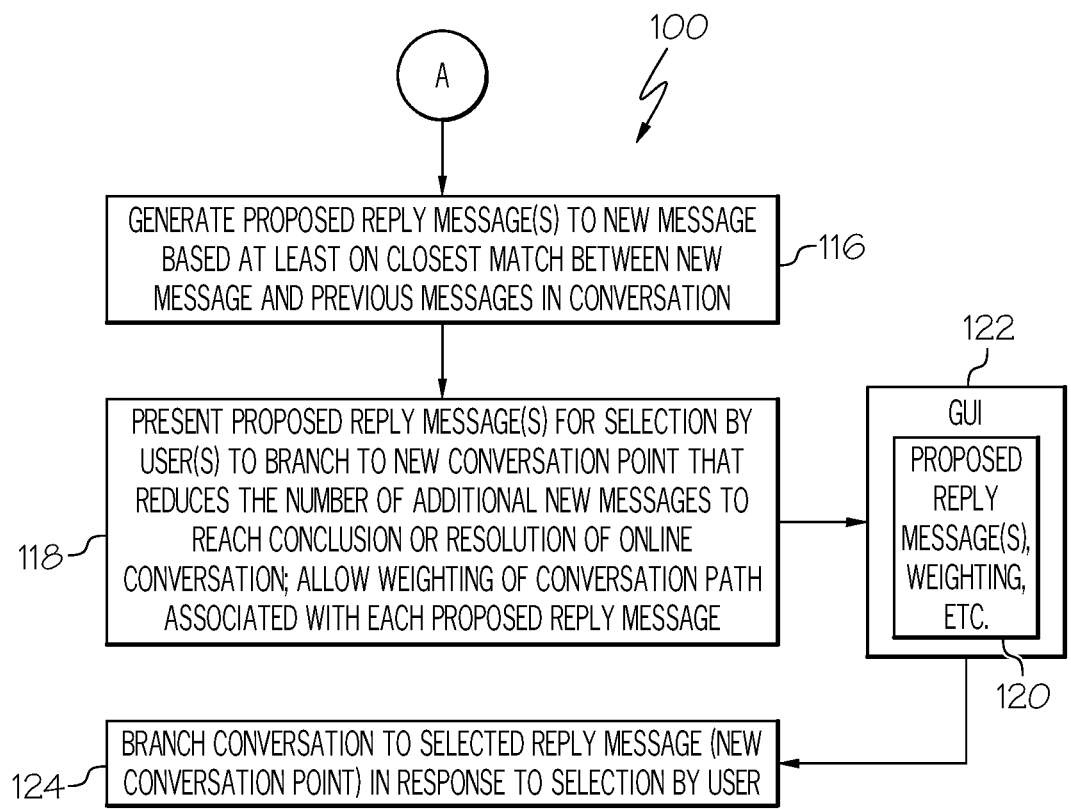
Figure 2:
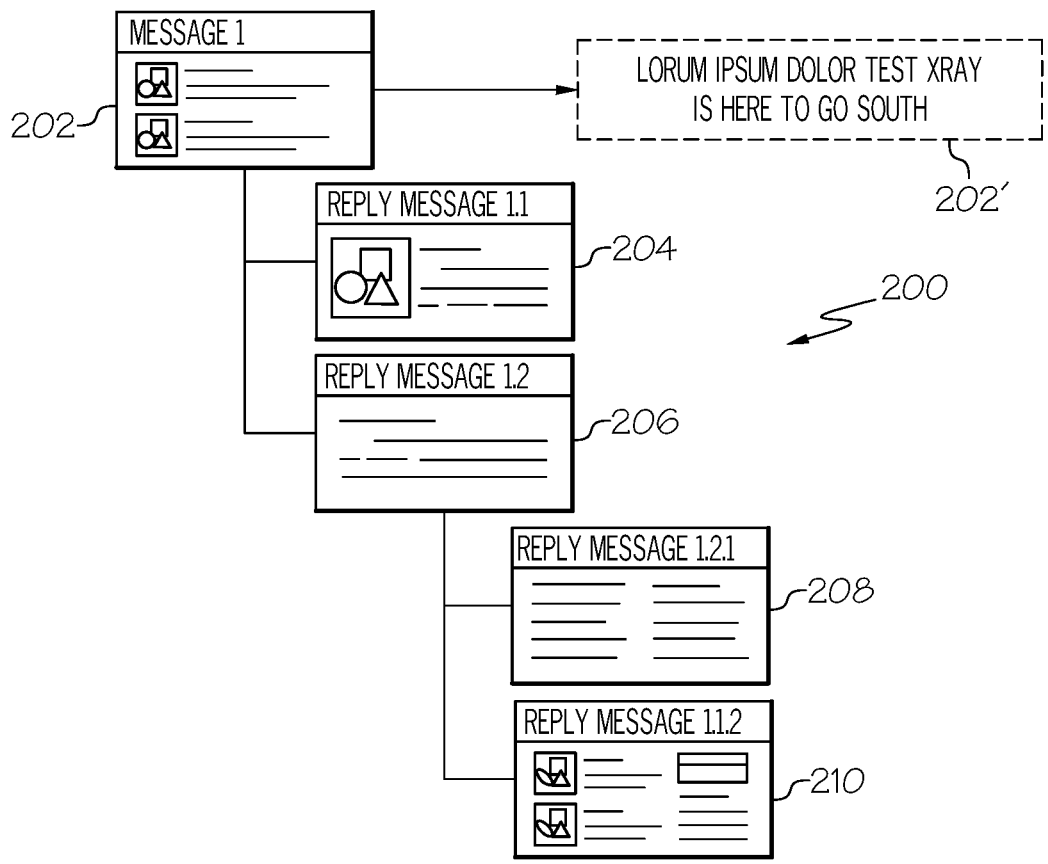
FIG. 2 is an example of online conversation branching in accordance with an embodiment of the present invention.

FIGS. 1A and 1B are a flow chart of an example of a method 100 for online conversation branching in accordance with an embodiment of the present invention. As used herein, an online conversation may be any type of electronic communications over a network, such as communications between mail clients, online social networks or mechanisms for communication, or other forms of online communications or conversations. The method 100 may be configured to work with streams of messages, such inboxes, activity streams, walls, update feeds or other types of online communications. In block 102, messages of an online conversation communicated between at least two users may be stored. A current message stream may be extracted from among multiple conversation participants. Storing the messages of the online conversation or extracted message stream may include storing each origin message paired with a reply message to the origin message. For example, referring also to FIG. 2, FIG. 2 is an example of online conversation 200 including branching in accordance with an embodiment of the present invention. The messages may be stored according to the following format:

[Message 1]→[Reply Message 1.1]
[Message 1]→[Reply Message 1.2]
[Reply Message 1.2]→[Reply Message 1.2.1]
[Reply Message 1.2]→[Reply Message 1.2.2]

As described in more detail herein, the reply messages 204-210 may be proposed or possible messages that may be selected by at least one of the users for branching the conversation to a new conversation point.

In block 104, a distinct fingerprint may be generated for each message by analyzing each message. The fingerprint may be defined as a grammar or other natural language processing (NLP) element that corresponds or correlates to the associated message. The fingerprint may be a much shorter bit string or data item than the corresponding or correlating message. The fingerprint maps to or identifies the corresponding message which may be a much larger bit string or data item than the fingerprint. Accordingly, the fingerprint of a particular message may identify or map to the particular message for all practical purposes just as a human fingerprint uniquely identifies an individual for practical purposes.

Analyzing each message to generate the corresponding or correlating fingerprint may include but is not necessarily limited to using natural language processing (NLP). Each message may be transformed into n-grams of one or more terms. For example, the exemplary message 202 in FIG. 2 may be transformed into one term n-grams, e.g., "Lorum, Ipsum, dolor, test, x-ray, is, here, to, go, south", two term n-grams, e.g., "Lorum Ipsum, Ipsum dolor, dolor test, test x-ray, x-ray is, is here, here to, to go, go south" and higher order n-grams grouping the words of the message accordingly. Other NLP processing techniques or linguistic processing techniques may also be used in processing messages to generate the correlating fingerprints. The processing techniques may include but is not necessarily limited to parts-of-speech n-grams, parse trees, lemmatization and pruning. Parts-of-speech n-grams may identify what part-of-speech each term in the message is, i.e., "noun Locum", "noun Ipsum", etc. for the message 202.

Figure 3:
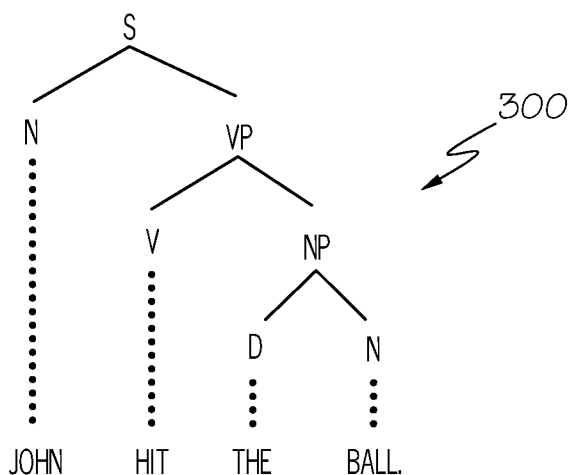
FIG. 3 is an example of a parse tree for use in analyzing a message to generate a fingerprint corresponding to the message in accordance with an embodiment of the present invention.

Referring also to FIG. 3, FIG. 3 is an example of a constituency based parse tree 300 for use in analyzing a message to generate a fingerprint corresponding to the message in accordance with an embodiment of the present invention. The fingerprint may be generated for a message by parsing each sentence or other component of a message using a parse tree. In FIG. 3 "S" corresponds to a sentence or other component of a message which may be the top-level in the exemplary parse tree 300 of FIG. 3. "N" represents nouns, "V" represents verbs, "D" represents a determiner or article "the" in the example of FIG. 3, "NP" represents a noun phrase, and "VP" represents a verb phrase. The parse tree 300 begins from a root node "S" and any ends in leaf nodes, "John (N), hit (V), the (D), ball (N)." VP and NP are branch nodes.

Lemmatization is a process of grouping together different inflected forms of a word so that they can be analyzed as a single item. For example, terms "is", "was", or "will be" may be analyzed as the term "to be" in generating a fingerprint corresponding to a sentence or phrase incorporating any of these terms.

Pruning may involve deleting certain words from a sentence or phrase that may be of lesser significance or meaning compared to other words that remain in the sentence or phrase. For example, "John hit the ball" may be pruned to leave the phrase "hit the ball" for use in generating a fingerprint.

Additionally, a custom dictionary may be provided or used to identify special words or keywords in generating a fingerprint. Specific actions may also be taken in generating a fingerprint based on a particular set of words that may be in a message. Overused words may also be discounted or not considered in generating fingerprints through use of a gazetteer.

Referring back to FIG. 1A, in block 106, each fingerprint may be stored in a lookup table 108. A pointer may be associated with each fingerprint to the original message that corresponds or correlates to the fingerprint. A logical grouping of fingerprints uniquely describes the conversation. The fingerprints may be used like a checksum or hash. Individual components of the fingerprint may be individual columns or treated as separate rows in the lookup table 108.

In block 110, a new message from one of the users or participants in the online conversation may be detected or received. The new message may be part of a current or existing conversation between the users. In block 112, the new message may be processed to generate an artifact that correlates to or may identify the new message. The artifact may be generated using NLP and/or linguistic processing techniques similar to those previously described in generating the fingerprints. The artifact may include at least one of a set of keywords, n-grams, parts-of-speech or other indicia that may correlate to the new message or identify the new message. For example, one of the users may transmit a new message "Lorum Ipsum is south." The new message may then be processed to generate at least one of keywords, n-grams or parts-of-speech, for example n-grams, "Lorum", "Ipsum", "To Be", and "South".

In block 114, the lookup table 108 may be queried using the artifact to determine a similarity between the new message and each of the previous messages in the conversation between the users to identify a closest similar message to the new message. The artifact may be compared to each fingerprint in the lookup table 108 to find a closest match. Accordingly, at least one of the set of keywords, n-grams, parts-of-speech, etc. may be compared to each fingerprint in the lookup table for each message to find the closest match. The closest match between the artifact for the new message and one of the fingerprints for the previously communicated messages will correspond or correlate to the closest similarity between the new message and the previous message that correlates to the one fingerprint. The method 100 may use a largest subset optimization algorithm to find highly correlated conversations or matches between a new message and previous conversations between the participants or users. As an example of a largest subset optimization algorithm, the following exemplary conversation may be exchanged between users:

| Message | |
|---|---|
| Message 1. | The dog is brown. |
| Message 1.1 | The fish is yellow. |
| Message 1.2 | The cat is blue. |
| Message 1.2.1 | The cat should be changed to green. |
| Message 1.3 | The cat is red. |
| Message 1.3.2 | The mule is brown. |

An incoming message "The cat is red" is received. The greatest shared subset is matched with Message 1.3 and 1.3.2 is the natural next suggestion or proposed reply. The incoming message is a reply to a prior message "The dog is brown" and the reply message is "The cat is blue." The greatest shared subset is Message 1 and Message 1.2 and Message 1.2.1 is the natural next suggestion or proposed reply. If "the dog is brown" is the only message, the method 100 or system would have two possible answers with 1.2 and 1.3. If there is a message 0 added, the subset could exist within the series of messages. If there is a sequence of new messages: Message new 1.—"The llamas are funny" and Message new 1.1—"The cat is blue." Message new 1 is not matched with any message in the example. Message new 1.1 is matched, and the greatest subset is "the cat is blue," and points to Message 1.2.1 as the next logical message.

In block 116, one or more proposed reply messages to the new message may be generated for branching the online conversation to a new conversation point. The new conversation point may correspond to a selected one of the one or more proposed reply messages. The new conversation point may reduce or optimize a number of additional new messages in the online conversation to reach a resolution or conclusion more efficiently. Accordingly, the new conversation point may shorten the online conversation to reach an end result faster by reducing or optimizing the number of origin messages and reply messages to satisfy a purpose of the online conversation between the users. The one or more proposed reply messages may be based on one of the stored messages that has a closest similarity to the new message. The stored message that has the closest similarity to the new message being found by comparing the artifact corresponding to the new message to the fingerprint for each previous message communicated between the users.

In block 118, the proposed reply message 120 or messages may be presented for selection by at least one of the users. The proposed reply message 120 or messages may be presented in a graphical user interface (GUI) 122. Each reply message may define a different conversation path and each different conversation path or proposed reply message may be assigned or may receive a weighting or priority. The weighting or priority may correspond to a prioritization for a particular outcome associated with each different conversation path or proposed reply message that may be selected by at least one of the users. Options for selection of an "ideal" path for resolution of an issue that is the subject of a current conversation may be provided. Weightings may be manually added to conversation paths or proposed reply messages to prioritize certain outcomes. While a conversation path with the fewest number of messages may be the most efficient, the shortest conversation path may not always be the most desirable path for one reason or another. Weighting or prioritizing the conversation paths or proposed reply messages may facilitate selection of a more desirable conversation path that may not necessarily be the shortest or have the fewest number of new messages to reach a resolution or conclusion of the online conversation.

A prior conversation or conversations between the users may also be presented to the users. Messages in the prior conversation or conversations may be highlighted or otherwise identified to show the users where they may be in the progress of the conversation.

The process in block 114 of determining possible or propose reply messages for branching the conversation may also be triggered in response to specific nouns or proper nouns, emotional undertones, such as frustration, or other indications in a current conversation that may suggest branching the conversation to a new conversation point. Such indications for triggering branching may be determined using NLP and/or the other linguistic processing techniques described above.

In block 124, the online conversation may branch to the new conversation point in response to one of the proposed reply messages or the only proposed reply message, if only one is proposed, being selected by at least one of the users. The new conversation point will correspond or correlate to the selected one of the proposed reply messages selected by at least one of the users.

In accordance with an embodiment, the user may not need to manually select one of the reply messages. The method 100 or system may select the branch on the user's behalf that has the highest weighting or similarity based on the comparison of the artifact to the fingerprints. The proposed reply message with the highest similarity may be automatically highlighted or identified. Although, the user may still be able to manually select another branch or proposed reply message if the highlighted message is not the desired reply message or branch.

Applying the method 100 to the example in FIG. 2 and an exemplary new message, "Locum Ipsum is south", received from one of the users, the lookup table 108 may be queried using the artifact, n-grams, keyword or parts-of-speech, "Lorum", "Ipsum", "To Be", and "South". Four of the words are the same as words in the previous message 202 and are 100% similar based on the keywords. Accordingly, one or more reply messages may be generated based on the message "Locum Ipsum dolor test xray is here to go south" 202. Proposed reply messages 1.1, 1.2, 1.2.1 and 1.2.2 may be presented for selection to branch to a new conversation point corresponding to the selected reply message. For each new message received, the method 100 or system may walk or cycle through the path of the conversation to find a closest message to the new message and upon reaching the end may present a proposed reply message or messages or next message in the conversation based on the closest previous message to the new message received from one of the users or participants in the online conversation.

The method 100 may operate over a set time window for reviewing earlier messages. For example, the set time window may be a day, a week or month. The set time window may also correspond to a time duration for a particular project or occurrence of a particular event, such as release of a new product. Only messages during that particular time duration would need to be part of the process of generating fingerprints and querying a lookup table or comparing an artifact from a new message to determine a branch or new conversation point for a current online conversation.

Figure 4:
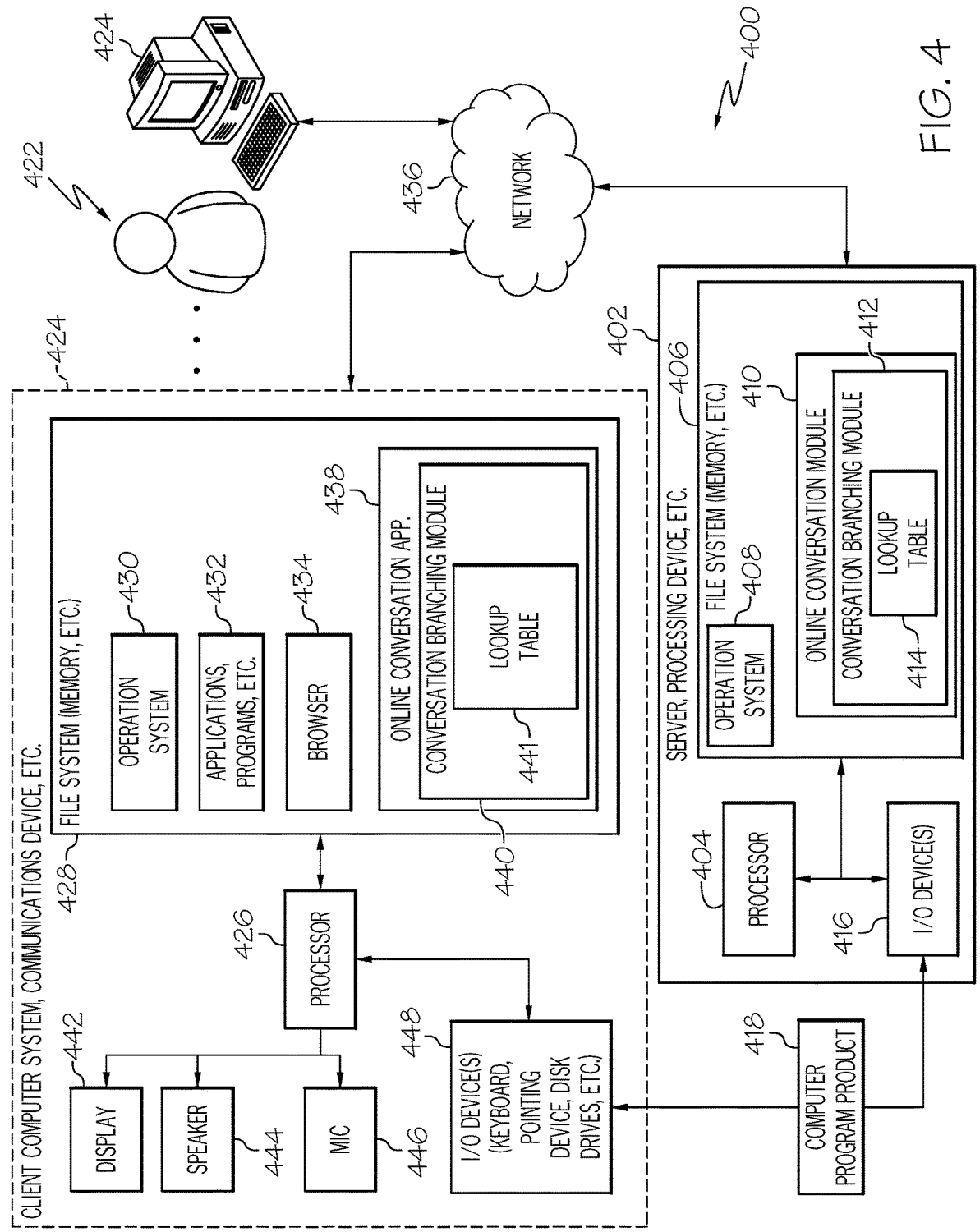
FIG. 4 is a block schematic diagram of an example of a system configured for online conversation branching in accordance with an embodiment of the present invention.

FIG. 4 is a block schematic diagram of an example of a system 400 configured for online conversation branching in accordance with an embodiment of the present invention. The method 100 of FIGS. 1A and 1B may be embodied in and performed by the system 400. The system 400 may include a processing device 402. The processing device 402 may be a server or similar processing device. The processing device 402 may include a processor 404 for controlling operation of the processing device 402 and for performing functions, such as those described herein with respect to filtering and sorting messages of a social network. The processing device 402 may also include a file system 406 or memory. An operating system 408, applications and other programs may be stored on the file system 406 for running or operating on the processor 404. A online conversation module 410 or system may also be stored on the file system 406 and may be compiled and run on the processor 404 to perform the functions for conducting online conversations between users and conversation branching similar to that described herein. The online conversation module 410 may be any type of online communications mechanism, such as a social networking program or module, an electronic mail or email program, or other program or module for online communications or conversations. The method 100 of FIGS. 1A-1B may be embodied in the online conversation module 410 and performed by the processor 404 when the online conversation module 410 is compiled and run on the processor 404.

The online conversation module 410 may include a conversation branching module 412. Similar to that previously described, the conversation branching module 412 may be configured to branch an online conversation to a new conversation point similar to that described with reference to the method 100 in FIGS. 1A-1B. In another embodiment, the conversation branching module 412 may be separate from the online conversation module 410 and operate in coordination with the online conversation module 410 to perform the operations described herein. The conversation branching module 412 may include a lookup table 414 or a lookup table may be a separate component associated with the conversation branching module 412. The lookup table 414 may be similar to the lookup table 108 in FIG. 1A. The fingerprints generated for each message in the method 100 may be stored in the lookup table 414.

The processing device 402 may also include one or more input devices, output devices or combination input/output devices, collectively I/O devices 416 in FIG. 4. The I/O devices 416 may include, but are not necessarily limited to, a keyboard or keypad, pointing device, such as a mouse, disk drive and any other devices to permit a user to interface with and control operation of the processing device 402 and to access the online conversation module 410 or system. At least one of the I/O devices 416 may be a device to read a computer program product, such as computer program product 418. The computer program product 418 may be similar to that described in more detail herein. The online conversation module 410 may be loaded on the file system 406 from a computer program product, such as computer program product 418.

A member of a social network or user 422 of the system 400 for social networking may use a computer system 424 or communications device to access the processing device 402 or server and online conversation module 410 or system. The computer system 424 or communications device may be any sort of communications device including a mobile or handheld computer or communications device. The computer system 424 may include a processor 426 to control operation of the computer system 424 and a file system 428, memory or similar data storage device. An operating system 430, applications 432 and other programs may be stored on the file system 428 for running or operating on the processor 426. A web or Internet browser 434 may also be stored on the file system 428 for accessing the processing device 402 or server via a network 436. The network 436 may be the Internet, an intranet or other private or proprietary network.

In accordance with an embodiment, an online conversation application 438, feature or module may also be stored on the file system 428 and operate on the processor 426 of the user's computer system 424. The online conversation application 438 may any sort of online communications mechanism, such as a social networking or social media application, electronic mail client or email application, or other application for online communications or conversations capable of performing the functions and operations described herein. The online conversation application 438 may include a conversation branching module 440 for branching conversations of members or users of a social network similar to that described herein. In another embodiment, the conversation branching module 440 may be a separate module from the online conversation application 438 and operate in cooperation with the online conversation application 438 to perform the functions described herein. The online conversation application 438 operating on the computer system 424 may interface with or operate in conjunction with the online conversation module 410 or system on the processing device 402 or server to perform the functions and operations described herein for organizing social media messages. Accordingly, online conversation application 438 operating on the computer system 424 may perform some of the functions and operations of the method 100 and online conversation module 410 operating on the server 402 may perform other functions of the method 100. Some embodiments of the present invention may include only the online conversation module 410 and conversation branching module 412 on the processing device 402 or server, and other embodiments may include only the online conversation application 438 and conversation branching module 440 on the client computer system 424 or communications device. A lookup table 441 may also be associated with the conversation branching module. As previously discussed, the lookup table 441 may store fingerprints that correlate or correspond to messages of an online conversation.

The computer system 424 may also include a display 442, a speaker system 444, and a microphone 446 for voice communications. One or more user interfaces may be presented on the display 442 for controlling operating the online conversation module 410 and online conversation application 438 and for performing the operations and functions described herein. For example, a graphical user interface configured for selecting a particular reply message from one or more proposed reply messages may be presented to a user for branching an online conversation to a new conversation point similar to that previously described.

The computer system 424 may also include one or more input devices, output devices or combination input/output devices, collectively I/O devices 448. The I/O devices 448 may include a keyboard or keypad, pointing device, such as a mouse, disk drives and any other devices to permit a user, such as user 422, to interface with and control operation of the computer system 424 and to access the online conversation application 438 and social networking module or system 410 and conversation branching module 412 on server 402. The I/O devices 448 may also include at least one device configured to read computer code from a computer program product, such as computer program product 418.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of embodiments of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to embodiments of the invention in the form disclosed. Many modifications and variations will be apparent to those of ordinary skill in the art without departing from the scope and spirit of embodiments of the invention. The embodiment was chosen and described in order to best explain the principles of embodiments of the invention and the practical application, and to enable others of ordinary skill in the art to understand embodiments of the invention for various embodiments with various modifications as are suited to the particular use contemplated.

Although specific embodiments have been illustrated and described herein, those of ordinary skill in the art appreciate that any arrangement which is calculated to achieve the same purpose may be substituted for the specific embodiments shown and that embodiments of the invention have other applications in other environments. This application is intended to cover any adaptations or variations of the present invention. The following claims are in no way intended to limit the scope of embodiments of the invention to the specific embodiments described herein.

What is claimed is:

1. A system for conversation branching, comprising:
    a processor;
    a conversation branching module operating on the processor, the conversation branching module being configured to cause the processor to perform a set of functions comprising:
        generating a fingerprint for each message of a plurality of messages in an online conversation between at least two users;
        storing the fingerprint for each message of the online conversation;
        receiving a new message from one of the users;
        generating an artifact that correlates to the new message;
        comparing the artifact to each fingerprint to determine a similarity between the new message and each message in the online conversation; and
        generating one or more proposed reply messages to the new message for branching the online conversation to a new conversation point that corresponds to a selected one of the one or more proposed reply messages, the one or more proposed reply messages being based at least on a closest similarity between the new message and a previous message in the online conversation.

2. The system of claim 1, wherein the conversation branching module is further configured to cause the processor to perform the set of functions comprising:
    presenting the one or more proposed reply messages for selection by at least one user, wherein the new conversation point reduces or optimizes a number of additional new messages in the online conversation to reach a conclusion; and
    branching the online conversation to the new conversation point in response to the selected one of the one or more proposed reply messages being selected by the at least one user.

3. The system of claim 1, wherein comparing the artifact to each fingerprint comprises identifying a closest match between the new message and one of the messages in the online conversation.

4. The system of claim 3, wherein comparing the artifact to each fingerprint comprises comparing at least one of a set of keywords, a set of n-grams and parts-of-speech to each fingerprint.

5. The system of claim 1, wherein storing the fingerprint for each message of the online conversation comprises storing a pointer to the message associated with the fingerprint.

6. The system of claim 1, wherein the set of functions further comprises storing the plurality of messages of the online conversation, wherein storing the plurality of messages comprises storing each origin message of the plurality of messages paired with a reply message to the origin message.

7. The system of claim 1, wherein generating the fingerprint for each message comprises transforming each message into a series of n-grams.

8. The system of claim 1, wherein generating the fingerprint for each message comprises at least one of parsing each component of each message using a parse tree and using lemmatization.

9. The system of claim 1, wherein generating the fingerprint for each message comprises using a custom dictionary to identify keywords.

10. The system of claim 1, wherein generating the fingerprint for each message comprise pruning each message to eliminate unnecessary terms.

11. The system of claim 1, wherein a logical grouping of the fingerprints uniquely describes the online conversation.

12. The system of claim 1, wherein the set of functions further comprises receiving a set time window to determine a branch for the online conversation to the new conversation point.

13. The system of claim 1, wherein generating the fingerprint for each message comprises using natural language processing.

14. The system of claim 1, wherein each proposed reply message of the one or more proposed reply messages defines a different conversation path, and further comprising receiving a weighting for each different conversation path, the weighting corresponding to a prioritization for a particular outcome associated with each different conversation path.

15. The system of claim 1, wherein the fingerprint for each message is stored in a lookup table.

16. A system for conversation branching, comprising:
    a processor;
    a conversation branching module operating on the processor, the conversation branching module being configured to cause the processor to perform a set of functions comprising:

generating a fingerprint for each message of a plurality of messages in an online conversation between at least two users;

storing the fingerprint for each message of the online conversation in a lookup table;

receiving a new message from one of the users;

generating an artifact that correlates to the new message;

comparing the artifact to each fingerprint in the lookup table to determine a similarity between the new message and each message in the online conversation; and generating one or more proposed reply messages to the new message for branching the online conversation to a new conversation point that corresponds to a selected one of the one or more proposed reply messages, the one or more proposed reply messages being based at least on a previous message in the online conversation having a closest similarity to the new message.

17. The system of claim 16, wherein comparing the artifact to each fingerprint in the lookup table comprises identifying a closest match between the new message and one of the messages of the plurality of messages in the online conversation.

18. The system of claim 16, wherein the set of functions further comprises:

presenting the one or more proposed reply messages for selection by at least one user, wherein the new conversation point reduces or optimizes a number of additional new messages in the online conversation to reach a conclusion; and branching the online conversation to the new conversation point in response to the selected one of the one or more proposed reply messages being selected by the at least one user.

19. A system for conversation branching, comprising:

a processor;

a conversation branching module operating on the processor, the conversation branching module being configured to cause the processor to perform a set of functions comprising:

storing a plurality of messages communicated in an online conversation between at least two users;

generating a fingerprint for each message in the online conversation;

storing the fingerprint for each message of the online conversation in a lookup table;

receiving a new message from one of the users;

generating an artifact that correlates to the new message;

comparing the artifact to each fingerprint in the lookup table to determine a similarity between the new message and each of the stored messages; and generating one or more proposed reply messages to the new message for branching the online conversation to a new conversation point that corresponds to a selected one of the one or more proposed reply messages, the one or more proposed reply messages being based at least on one of the stored messages that has a closest similarity to the new message.

20. The system of claim 19, wherein comparing the artifact to each fingerprint in the lookup table comprises identifying a closest match between the new message and one of the stored messages.

* * * * *